United States Patent Office 3,261,823
Patented July 19, 1966

3,261,823
METALLIFEROUS ETHIONYLAMINOARYL
AZO-DYESTUFFS
Rudolf Kühne and Fritz Meininger, Frankfurt am Main, Walter Noll, Bad Soden, Taunus, and Helmut Rinno and Siegfried Schiessler, Frankfurt am Main, Germany, assignors to Farbwerke Hoechst Aktiengesellschaft vormals Meister Lucius & Brüning, Frankfurt am Main, Germany, a corporation of Germany
No Drawing. Filed Aug. 24, 1962, Ser. No. 219,138
Claims priority, application Germany, Aug. 26, 1961, F 34,782
7 Claims. (Cl. 260—149)

The present invention relates to novel metalliferous azo-dyestuffs and to a process for preparing them; more particularly it relates to complex metal compounds of azo-dyestuffs having the general formula $$F-Z_n$$

in which F represents the radical of an azo-dyestuff molecule containing a grouping capable of forming metal complexes and advantageously at least one group imparting solubility in water, Z represents the group

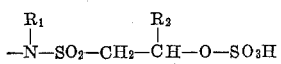

wherein $R_1$ represents hydrogen, an aliphatic or cycloaliphatic hydrocarbon radical, and $R_2$ hydrogen or an aliphatic hydrocarbon radical, and $n$ stands for an integer.

We have found that valuable novel complex metal compounds of azo-dyestuffs are obtained by reacting azo-dyestuffs containing a grouping which is able to form metal complexes and preferably at least one group imparting solubility in water and once or several times the group

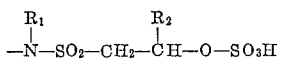

in which $R_1$ represents hydrogen, an aliphatic or cycloaliphatic hydrocarbon radical and $R_2$ represents hydrogen or an aliphatic hydrocarbon radical with agents yielding metal.

As solubilizing groups there are especially used carboxylic acid and sulfonic acid groups. These groups may be distributed optionally in the dyestuff molecule, for example in such a manner that only one component used for the preparation of dyestuff or both components contain at least one carboxylic acid or sulfonic acid group. There may also be used azo-dyestuffs which, in addition to the above-mentioned ethionylamino group contain no further group imparting solubility in water.

As starting materials there are suitable in principle all azo-compounds which are able to form complex metal dyestuffs, so long as they contain at least one ethionylamino group of the above formula, for example o,o'-dihydroxyazo-dyestuffs, o-hydroxy-o'-aminoazo-dyestuffs, o-amino-o'-carboxyazo - dyestuffs, o-hydroxy-o'-carboxyazo-dyestuffs as well as o-hydroxy-o'-alkoxyazo-dyestuffs or o-hydroxy-o'-(o - carboxy - methoxy) - azo - dyestuffs which, with the formation of metal complexes, change to o,o'-dihydroxyazo-dyestuffs and o-hydroxyazo-dyestuffs which with the oxidizing metallization change to o,o'-dihydroxyazo-dyestuffs.

The starting materials free from metal can be prepared according to known methods by coupling, for example, o-hydroxy or o-carboxy diazo compounds of the benzene or naphthalene series with coupling components coupling in a position adjacent to a hydroxy group or to an enolizable keto group or in a position adjacent to an amino group. The choice of the diazo and coupling components used for the formation of dyestuffs should be made in such a manner that the finished dyestuff contains at least one ethionylamino group of the above-mentioned formula and preferably at least one acid group imparting solubility in water.

The o,o'-dihydroxyazo-dyestuffs mentioned as starting materials can also be prepared indirectly by coppering the corresponding o-hydroxy-o'-alkoxyazo-dyestuffs to become dealkylated or by treating o-hydroxyazo-dyestuffs containing an ethionylamino group and in addition thereto a free o'-position in a weakly acid solution with copper salts and an oxidizing agent. The complex compounds so obtained can, subsequently, be decoppered for example by treating with strong mineral acid or hydrogen sulfide and converted into the o,o'-dihydroxyazo-dyestuffs desired.

According to the process of the present invention the azo-dyestuffs of the formula mentioned above used as starting materials are reacted with an agent yielding metal. The reaction of the agent yielding metal with the starting materials can also be effected with dyestuffs as they are included in the coupling mixture.

As agents yielding metal there are used, for example, salts of manganese, iron, aluminium, especially, however, salts of cobalt, chromium, copper and nickel such as chromium sulfate, cobalt, acetate, cobalt sulfate, copper acetate or copper sulfate. There may also be used agents yielding metal which contain the metal bound in a complex form, for example complex chromium compounds of organic hydroxycarboxylic acids such as, for example salicylic acid or complex cobalt or copper compounds of the alkali metal salts of aliphatic hydroxycarboxylic acids such as lactic acid and especially tartaric acid, for example sodium copper tartrate.

The reaction of the starting dyestuffs with the agents yielding metal can be effected, for example, in such a manner that the aqueous preparation mixture is heated in a weakly acid or neutral medium to temperatures between 20° and 130° C., if desired under reflux condensing or in a closed vessel. If necessary, there may also be added organic solvents, such as alcohol or dioxane.

In the complex metal dyestuffs obtained according to the present invention the molar ratio of metal:monoazo-dyestuff is 1:1 when the metals are copper or nickel, and 1:1 or 1:2 when the metals are cobalt or chromium. In the form of their alkali metal salts the complex metal dyestuffs obtainable according to the invention are readily soluble in water. They are suitable for dyeing and printing various materials such as wool or polyamide fibers, advantageously, however, textile materials containing cellulose such as regenerated cellulose, linen, cellulose or especially cotton. The novel dyestuffs are suitable for dyeing materials containing cellulose according to the direct dyeing method, the padding-steaming process or the printing process. With the aid of acid-binding agents the dyestuffs are fixed on the textile materials to be dyed, if desired in the hot. This process can be carried out in such a manner that the dyed textile material is after-treated with an acid-binding agent or that the acid-binding agent is caused to act upon the textile material before or during the treatment with the dyestuff.

The dyeings and prints obtained with the novel azo-dyestuffs are distinguished by a good to very good fastness to light and outstanding properties of wet fastness, particularly against vigorous washing.

The following examples serve to illustrate the invention but they are not intended to limit it thereto, the parts and percentages being by weight unless otherwise stated and the relationship of parts by weight to parts by volume being the same as that of the kilogram to the liter.

As will particularly be seen from the examples, the dyestuffs of the present invention are complex metal compounds of azo-dyestuffs, containing copper, cobalt, nickel, or chromium and an azo-dyestuff of the formula

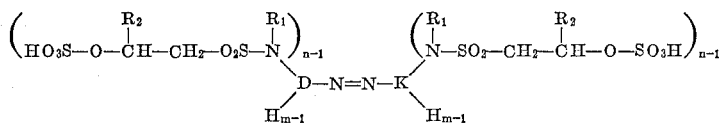

wherein $R_1$ is a member of the group consisting of hydrogen, cyclohexyl, and alkyl having 1 to 5 carbon atoms; $R_2$ is a member of the group consisting of hydrogen and alkyl having 1 to 5 carbon atoms; $n$ and $m$ are each an integer from 1 to 2 inclusive, the sum of $n+m$ being 3, at least one group

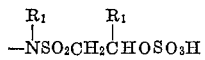

being present in the dyestuff molecule; D is a member selected from the group consisting of benzene, o-hydroxybenzene, o-methoxybenzene, o-carboxybenzene, o-methoxybenzene sulfonic acid, o-hydroxybenzene mono- and di-sulfonic acids, o-carboxybenzene sulfonic acid, o-methoxymethoxy benzene, o-hydroxy chlorobenzene sulfonic acid, o-hydroxy acetylamino benzene sulfonic acid, o-hydroxy nitrobenzene sulfonic acid, and o-hydroxy naphthalene sulfonic acid; and K is the radical of a coupling component selected from the group consisting of (a) 1-phenyl-5-pyrazolone substituted in the 3-position by a member of the group consisting of —$CH_3$ and —COOH,
(b) 1-(2'-chloro-4'-sulfo-6'-methyl-phenyl) - 3 - methyl-5-pyrazolone,
(c) 1-(4' - β - hydroxyethyl - sulfone - sulfuric acid esterphenyl)-3-methyl-5-pyrazolone,
(d) Naphthalene mono- and di-sulfonic acids substituted by at least one member of the group consisting of hydroxyl, amino, methylamino, acetylamino, benzoylamino, and carboxyphenylamino,
(e) Diamino benzene,
(f) Acetoacetylamino benzene,
(g) Phenylazo hydroxyaminonaphthalene,
(h) Phenylazo dihydroxynaphthalene disulfonic acid,
(i) Aminobenzene sulfonic acid substituted by a member of the group consisting of amino and hydroxy,
(j) Hydroxy azophenyl benzene,
(k) 1-(3'-phenylamino-2',4',6'-triazinyl-5')-amino-8 - hydroxy-naphthalene-3,6-disulfonic acid substituted in the 1'-position of the triazine ring by a member of the group consisting of —Cl and —$OCH_3$.

The molar ratio between the metal and azo-dyestuff, is 1:1 for copper, cobalt, nickel and chromium, and may also be 1:2 for cobalt and chromium. The compounds contain at least one water-solubilizing sulfonic acid or carboxylic acid group.

*Example 1*

A solution of 364 parts of the monopotassium salt of 1-hydroxy-2-amino-4-N-methyl - N - ethionylaminobenzene in 1000 parts by volume of water was diazotized at 0° to 5° C. by the addition of 1500 parts by volume of 2 N-hydrochloric acid and 200 parts by volume of 5 N-sodium nitrite solution and subsequently the pH-value was adjusted to 5 to 6 by strewing in sodium bicarbonate.

361 parts of 1-acetylamino-8-hydroxynaphthalene-3,6-disulfonic acid were dissolved in 1500 parts by volume of water, neutralized with sodium hydroxide solution and coupled with the solution of the diazonium salt. The mixture was stirred at 40° C. and, by the addition of sodium bicarbonate a pH-value of 4 to 6.5 was maintained until coupling was complete. The dyestuff obtained was salted out with sodium chloride, suction-filtered and dried.

129 parts (of 59.3% strength calculated on the sodium salt) of the o,o'-dihydroxyazo-dyestuff obtained were dissolved in 1000 parts by volume of water. 26 parts of crystallized copper sulfate and 34 parts of crystallized sodium acetate were then introduced and the mixture was heated to 60° to 65° until the reaction was complete. The dyestuff containing copper was isolated by evaporating the mixture at 50° C. It was a black powder which, when printed on cotton in the presence of sodium bicarbonate, yielded a violet tint possessing good to very good properties of wet fastness.

*Example 2*

129 parts (of 59.3% strength calculated on the sodium salt) of the o,o'-dihydroxyazo-dyestuff free from metal described in Example 1 were dissolved in 1000 parts by volume of water. To the solution so obtained 26 parts of chrome alum and 28 parts of crystallized sodium acetate were added and the mixture was boiled under reflux or heated in a closed vessel to 125° C. until the formation of the complex chromium dyestuff was complete. After drying by atomization a dark blue powder was obtained. In the presence of an acid-binding agent the dyestuff dyed cellulose fibers grey-blue tints possessing good to very good properties of wet fastness and a very good fastness to light.

*Example 3*

90 parts (of 79.5% strength calculated on the potassium salt) of the monoazo-dyestuff obtained by coupling diazotized 1-hydroxy-2-amino-4-N-methyl - N - ethionylaminobenzene with 1-(2'-chloro-6'-methyl-4'-sulfophenyl)-3-methyl-5-pyrazolone were dissolved at 60° to 65° C. in 800 parts by volume of water. To the solution so obtained 34 parts of crystallized sodium acetate and 26 parts of crystallized copper acetate were added and the temperature was maintained at 60° to 65° C. When the reaction was complete the complex copper compound was precipitated by the addition of potassium chloride, suction-filtered and dried.

The dyestuff obtained dyed cotton in the presence of sodium carbonate yellow brown tints possessing a very good fastness to light and to washing.

*Example 4*

90 parts (of 79.5% strength calculated on the potassium salt) of the azo-dyestuff free from metal described in Example 3 were dissolved at 60° to 65° C. in 800 parts by volume of water. Subsequently 28 parts of crystallized sodium acetate and 14.5 parts of cobalt sulfate were added and the temperature was maintained at 60° to 65° C. until the formation of the complex dyestuff was complete. By the addition of potassium chloride the complex cobalt compound was precipitated, filtered off and dried. With the brown dyestuff powder obtained yellow brown prints possessing a good fastness to washing and a very good fastness to light could be prepared on cotton in the presence of sodium bicarbonate.

*Example 5*

90 parts of the azo-dyestuff free from metal described in Example 3 were dissolved in 800 parts by volume of water. To the solution obtained 28 parts of crystallized sodium acetate and 26 parts of chrome alum were added and the mixture was heated at the boil. It was boiled under reflux until the complex chromium compound had formed. Subsequently the dyestuff was salted out, filtered off and dried. The dyestuff was a brown powder which, when printed on cotton in the presence of sodium carbonate yielded red brown prints possessing a good to very good fastness to light and good to very good properties of wet fastness.

Example 6

68.8 parts of the sodium salt of the azo-dyestuff obtained by coupling 1-diazo-2-hydroxynaphthalene-4-sulfonic acid with 1-acetoacetylamino-4-N-methyl - N - ethionylaminobenzene were dissolved in 350 parts by volume of water. Subsequently 30 parts of sodium acetate and 28.6 parts of chrome alum were added to the dyestuff solution and the mixture was boiled under reflux until the formation of the complex dyestuff was complete. For isolating the complex chromium compound the mixture was completely evaporated in vacuo. A red brown powder was obtained which was readily soluble in water.

A printing paste was prepared by mixing 20 parts of the complex chromium dyestuff obtained, 50 parts of urea, 400 parts of an aqueous sodium alginate solution of 5% strength, 500 parts of water and 20 parts of sodium carbonate. On rollers the printing paste so obtained was applied to a cotton fabric and after drying steamed for 5 minutes at 101° to 103° C. The fabric was rinsed in water, boiled for 5 minutes in a dilute soap solution, rinsed again in water and dried. A red brown print possessing a very good fastness to washing was obtained.

Example 7

To a solution of 364 parts of the potassium salt of 1-hydroxy-2-amino-4-N-methyl-N-ethionylaminobenzene in 1000 parts by volume of water 1500 parts by volume of 2 N-hydrochloric acid were added at 0° to 5° C. and the mixture was diazotized by the addition of 200 parts by volume of 5 N-sodium nitrite solution. The nitrite in excess was removed with amidosulfonic acid. Into the diazonium salt solution adjusted to a pH-value of 5 to 6 a neutralized solution of 188 parts of 1,3-diaminobenzene-4-sulfonic acid in 1500 parts by volume of water was rapidly introduced. The mixture was stirred at 40° to 45° C. until the coupling was complete and by the addition of sodium bicarbonate a pH-value of 4 to 6 was maintained. The dystuff obtained was precipitated with sodium chloride, filtered off and dried at 50° C. in vacuo.

105 parts (of 54.2% strength calculated on the sodium salt) of the o-hydroxy-o′-aminoazo-dyestuff obtained were dissolved at 60° to 65° in 800 parts by volume of water. To the solution obtained 28 parts of crystallized sodium acetate and 14.5 parts of cobalt sulfate were added and the mixture was stirred at 60° to 65° C. until the starting dyestuff could no more be detected. The mixture was then cooled and potassium chloride was added. The precipitated complex cobalt compound was isolated by filtration and drying. A dark dyestuff powder was obtained which dissolved readily in water to give a brown solution and which according to the process described in Example 6 yielded a brown cotton print being fast to light and to washing.

Example 8

105 parts of the azo-dyestuff free from metal obtained as described in Example 7 were dissolved in 800 parts of water and after the addition of 34 parts of crystallized sodium acetate and 26 parts of crystallized copper sulfate heated to 60° to 65° C. The formation of the complex copper compound being complete, the product was precipitated with potassium chloride, filtered off and dried. The dyestuff was a dark brown powder which dyed cotton in the presence of sodium carbonate red brown tints possessing a very good fastness to washing.

Example 9

223 parts of 2-aminonaphthalene-7-sulfonic acid were neutralized in 1500 parts by volume of water with sodium hydroxide solution. The solution obtained was coupled with the diazonium salt solution described in Example 7 and stirred at 40° to 50° C. By strewing in sodium bicarbonate the pH-value was maintained at 4 to 6 until the coupling was complete. The product was salted out with saturated potassium chloride solution, suction-filtered and dried in vacuo at 40° C.

92 parts (of 69.1% strength calculated on the potassium salt) of the azo dyestuff free from metal obtained were dissolved in 800 parts by volume of water for converting into the complex cobalt compound and 28 parts of crystallized sodium acetate and 14.5 parts of cobalt sulfate were added. The mixture was stirred at 60° to 65° C., until the formation of the cobalt complex was complete. For isolating the product the dyestuff solution was evaporated to dryness in vacuo at 40° C. The dyestuff obtained yielded on cotton in the presence of an acid-binding agent grey prints possessing a good fastness to light and a very good fastness to washing.

Example 10

57.7 parts of the monoazo-dyestuff obtained by coupling diazotized 1-methoxy-2-aminobenzene-4-sulfonic acid with 1,3 - diamino - 4-N-methyl-N-ethinoylaminobenzene were dissolved at 85° to 98° C. in 980 parts by volume of water. To the solution 19 parts of crystallized sodium acetate and 17 parts of cobalt sulfate were added and the temperature of 85° to 98° C. was maintained until the formation of the metal complex was complete. For isolating the product the dyestuff solution was evaporated to dryness in vacuo at 40° to 50° C. A dark brown powder was obtained which in the presence of sodium carbonate yielded on cotton brown prints and dyeings possessing very good properties of wet fastness.

Example 11

84 parts of the monoazo-dyestuff obtained by coupling diazotized 1 - ethoxy - 2-amino - 4 - N-methyl-N-ethionylaminobenzene with 1-acetylamino-8-hydroxynaphthalene-3,6-disulfonic acid were dissolved in 500 parts by volume of water. To the solution obtained 30 parts of crystallized sodium acetate and 25 parts of crystallized copper sulfate were added and the mixture was maintained at a pH-value of 4.5 to 5.0 and at a temperature of 90° to 95° C. When the reaction was complete the complex copper dyestuff was isolated by drying by atomization.

The product obtained was identical with the dyestuff described in Example 1.

Example 12

79.9 parts of the monoazo-dyestuff obtained by coupling diazotized 1,3-dimethoxy-6-amino-4-N-methyl-N-ethionylaminobenzene with 2-hydroxynaphthalene-3,6-disulfonic acid were dissolved in 1400 parts by volume of water. To the solution 30 parts of crystallized sodium acetate and 25 parts of crystallized copper acetate were added and the mixture was stirred at 93° to 97° C. while maintaining a pH-value of 4.5 to 5.0 until the formation of the copper complex was complete. By evaporating the dyestuff solution in vacuo the product was isolated. A dark powder was obtained which dissolved in water to give a blue red solution and yielded on cotton in the presence of potassium carbonate claret dyeings possessing very good properties of wet fastness.

Dyeings possessing the same good properties of wet fastness were obtained by using for the preparation of the o-hydroxy-o′-methoxyazo-dyestuffs the compound of the following formula

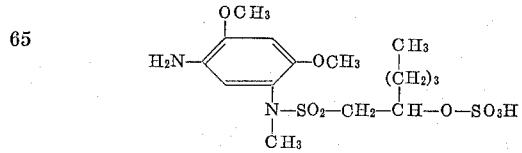

instead of 1,3-dimethoxy-6-amino-4-N-methyl-N-ethionylaminobenzene.

Example 13

47.7 parts of the potassium salt of the monoazo-dyestuff obtained by coupling diazotized 6-chloro-2-aminophenol-4-sulfonic acid with 2-N-methyl-N-ethionylamino-8-hydroxynaphthalene-6-sulfonic acid were dissolved in 500 parts by volume of water. After the addition of 40 parts of crystallized sodium acetate and 16 parts of copper sulfate the mixture was stirred at 70° to 75° C. until the formation of the copper complex was complete. Subsequently the dyestuff was salted out with potassium chloride, suction-filtered and dried in vacuo at 40° C.

(a) 20 parts of the complex copper dyestuff and 5 parts of sodium hydroxide were dissolved in 1000 parts by volume of water. Cotton fabric was impregnated at 20° C. with this dyestuff solution and subsequently squeezed off to an increase in weight of 80%. The material was rolled on a roller, wrapped in a foil and left on the roller for about 16 hours at 18° to 25° C. while turning the latter. The material was then acidified, rinsed in boiling water and dried. A claret dyeing possessing a very good fastness to light and to washing was obtained.

(b) 40 parts of viscose rayon fabric were treated for 1 hour at 20° C. while vigorously stirring with 1000 parts by volume of a liquor containing 2.5 parts of the complex copper dyestuff, 50 parts of sodium sulfate and 10 parts of sodium hydroxide. Subsequently the dyeing was rinsed at the boil and dried. The claret dyeing obtained was distinguished by a very good fastness to light and to washing.

(c) 100 parts of cotton fabric were impregnated with an aqueous solution of 3% strength of the complex copper dyestuff and squeezed off to an increase in weight of about 80%. The material thus impregnated was dried, padded with a solution containing per liter of water 250 grams of sodium chloride and 10 grams of sodium hydroxide and squeezed off again until the weight was 200 parts. Subsequently the material was steamed for 30 seconds at 100° to 102° C., rinsed in water and dried. A claret dyeing possessing a very good fastness to light and to washing was obtained.

Example 14

77.2 parts of the monoazo-dyestuff obtained by coupling in a weakly alkaline medium diazotized 1-hydroxy-2-amino-4-N-methyl-N-ethionylaminobenzene with 1-hydroxy-6-(3'-carboxyphenyl)-amino-naphthalene - 3 - sulfonic acid were dissolved at 85° to 90° C. in 1500 parts by volume of water. For the conversion into the complex chromium compound 22 parts of crystallized sodium acetate, 27.5 parts of chrome alum and 3.5 parts of sodium carbonate were added in order to adjust the pH-value to 4.5 to 5 and the temperature was maintained at 85° to 90° C. When the 1:2-chromium complex had formed the dyestuff was isolated by drying by atomization. It was a dark powder which was readily soluble in water and which dyed cellulose fibers according to the processes described in Example 13 (a to c) in the presence of sodium hydroxide marine blue tints possessing a very good fastness to wet processing and to light.

Example 15

85.6 parts of the azo-dyestuff obtained by coupling diazotized 1,4 - dimethoxy - 2 - amino - 5 - N-methyl-N-ethionylaminobenzene with 1-acetylamino-8-hydroxynaphthalene-3,6-disulfonic acid were dissolved at 95° to 97° C. in 975 parts by volume of water. For the preparation of the complex copper compound which was carried out at a pH-value of 4.5 to 5.0, 30 parts of crystallized sodium acetate and 25 parts of crystallized copper sulfate were added to the solution and the temperature was maintained at 95° to 97° C. The product was isolated at 50° C. in vacuo by evaporating the violet blue dyestuff solution. There was obtained a black blue powder which was readily soluble in water and which yielded on cotton in the presence of potassium carbonate blue dyeings and prints possessing a very good fastness to wet processing and a good to very good fastness to light.

By using instead of 1,4-dimethoxy-2-amino-5-N-methyl-N-ethionylaminobenzene the compound of the following formula

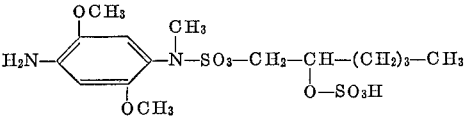

there are equally obtained blue dyeings and prints possessing very good properties of wet fastness.

Example 16

34.8 parts of the potassium salt of 1-amino-4-N-methyl-N-ethionylaminobenzene were introduced into a mixture of 125 parts by volume of 2 N-hydrochloric acid and 200 parts of ice powder and diazotized with 20 parts by volume of 5 N-sodium nitrite solution. Subsequently the diazonium salt solution was coupled with a solution of 15.9 parts of 1-amino-7-hydroxynaphthalene in 115 parts by volume of ice water and 40 parts by volume of 2 N-hydrochloric acid. To the coupling mixture 40 parts by volume of sodium acetate solution of 25% strength were added and the mixture was stirred until the coupling was complete. The precipitated dyestuff was filtered off, after-washed with ice-cold water and then introduced while stirring into 500 parts by volume of water.

To the dyestuff solution a diazonium salt solution was added which had been prepared from 13.45 parts of 2-aminophenol-4,6-disulfonic acid, 75 parts by volume of 2 N-hydrochloric acid, 100 parts of ice powder and 10 parts by volume of 5 N-sodium nitrite solution. By strewing in sodium carbonate the coupling mixture was maintained at a pH-value of 6.8 to 7. When the coupling was complete 12.5 parts of crystallized copper sulfate were added to the mixture which was after-stirred until the formation of complex was complete. The dyestuff solution was then filtered and evaporated to dryness at a pH-value of 5 and at a temperature of 50° to 60° C.

There was obtained a dark brown powder which was readily soluble in water and which in the presence of sodium bicarbonate yielded on cellulose fibers brown dyeings or prints possessing a good fastness to light and a very good fastness to wet processing.

Example 17

34.8 parts of the potassium salt of 1-amino-4-N-methyl-N-ethionylaminobenzene were diazotized as described in Example 16 and 5 parts of crystallized sodium acetate were added. Into the diazonium salt solution a solution of 12 parts of phenol in 50 parts by volume of acetone were introduced within about 1 hour. During the coupling a pH-value of 5 to 6 was maintained by adding sodium carbonate. When the reaction was complete the monoazo-dyestuff obtained was precipitated, filtered and introduced at 5° to 10° into a diazonium salt solution which had been prepared from 17.3 parts of 1-aminobenzene-3-sulfonic acid by diazotization with sodium nitrite. By the addition of 15.5 parts of sodium carbonate a pH-value of 8 to 8.4 was maintained until the coupling was complete. The brown dyestuff solution was filtered, 25 parts of crystallized copper sulfate and 27 parts of crystallized copper sulfate and 27 parts of crystallized sodium acetate were added and the mixture was stirred for 30 minutes at the usual temperature. Subsequently 50 parts by volume of hydrogen peroxide of 9% strength were introduced within 1½ hours. The complex copper dyestuff formed was precipitated with potassium chloride, filtered off, washed with saturated potassium chloride solution and dried. A dark brown powder was obtained which in the presence of sodium carbonate yielded on cotton brown dyeings possessing a good to very good fastness to washing.

Example 18

The monazo-dyestuff obtained by coupling in an alkaline medium 18.9 parts of diazotized 2-aminophenol-5-sulfonic acid with 31.9 parts of 1-amino-2-hydroxynaphthalene-3,6-disulfonic acid was condensed in known manner at a pH-value of 5 to 6 with 18 parts of 1-methoxy-3,5-dichloro-2,4,6-triazine. The dyestuff containing in the molecule still one chlorine atom was dissolved in 400 parts by volume of water and 34.8 parts of the potassium salt of 1-amino-4-N-methyl-N-ethionylamino-benzene were added. By adding dropwise a dilute potassium bicarbonate solution the mixture heated to 85° to 90° C. was maintained at a pH-value of 5.5 of 6.5. When the formation of the secondary condensation product was complete 25 parts of crystallized copper sulfate and 28 parts of crystallized sodium acetate were added to the mixture which was after-stirred at 50° to 60° C. and at a pH value of 4.5 to 5.5. By the addition of potassium chloride the complex copper compound was precipitated from the previously filtered dyestuff solution. The product dyed cotton in the presence of sodium bicarbonate very fast violet tints.

By using 2-aminobenzene-1-carboxylic acid-5-sulfonic acid instead of 2-aminophenol-5-sulfonic acid a dyestuff was obtained which dyed materials containing cellulose reddish blue tints possessing good to very good properties of wet fastness.

The following table indicates a number of further metalliferous azo-dyestuffs obtainable according to the present invention and the tints of the dyeings or prints obtained with these dyestuffs on cellulose fibers in the presence of an acid-binding agent.

|    | Diazo component | Coupling component | Metal | Tint |
|---|---|---|---|---|
| 1  | 1-hydroxy-2-amino-4-N-ethionylaminobenzene | 2-hydroxynaphthalene-3,6-disulfonic acid | Cu | Claret. |
| 2  | ....do | 1-benzoylamino-8-hydroxynaphthalene-4,6-disulfonic acid | Cu | Violet. |
| 3  | ....do | 2-methylamino-naphthalene-7-sulfonic acid | Co | Grey. |
| 4  | ....do | 1-acetylamino-8-hydroxynaphthalene-4,6-disulfonic acid | Cu | Violet. |
| 5  | ....do | ....do | Co | Do. |
| 6  | ....do | ....do | Cr | Blue grey. |
| 7  | ....do | 1-hydroxynaphthalene-4-sulfonic acid | Cu | Claret. |
| 8  | ....do | 2-aminonaphthalene-6-sulfonic acid | Co | Red brown. |
| 9  | ....do | 1-hydroxy-3-aminobenzene-6-sulfonic acid | Co | Black brown. |
| 10 | ....do | 2-acetylamino-8-hydroxynaphthalene-6-sulfonic acid | Cu | Red violet. |
| 11 | 1-methoxy-2-amino-4-N-ethionylaminobenzene | 1-acetylamino-8-hydroxy-naphthalene-3,6-disulfonic acid | Cu | Violet. |
| 12 | 1-amino-3-N-n-butyl-N-ethionylaminobenzene | 1-hydroxynaphthalene-4-sulfonic acid | Cu | Claret. |
| 13 | 1-hydroxy-2-amino-5-N-methyl-N-ethionylaminobenzene | 1-hydroxynaphthalene-5-sulfonic acid | Cu | Do. |
| 14 | ....do | 2-hydroxynaphthalene-8-sulfonic acid | Cu | Red brown. |
| 15 | ....do | 6-acetylamino-1-hydroxy-naphthalene-3-sulfonic acid | Cu | Claret. |
| 16 | ....do | 1-hydroxynaphthalene-3-sulfonic acid | Cu | Do. |
| 17 | ....do | 2-hydroxynaphthalene-6,8-disulfonic acid | Cu | Brown. |
| 18 | ....do | 1-acetylamino-8-hydroxynaphthalene-3,6-disulfonic acid | Cu | Violet. |
| 19 | ....do | 1-phenyl-5-pyrazolone-3-carboxylic acid | Cu | Yellow brown. |
| 20 | 1-hydroxy-2-amino-4-N-methyl-N-ethionylamino-benzene | Condensation product of diazotized 1-amino-4-N-methyl-N-ethianylaminobenzene and 1,8-dihydroxynaphthalene-3,6-disulfonic acid | Cu | Blue. |
| 21 | 2-aminophenol-4-sulfonic acid | 2-N-methyl-N-ethionyl-amino-8-hydroxynaphthalene-6-sulfonic acid | Cu | Ruby. |
| 22 | ....do | ....do | Co | Claret. |
| 23 | ....do | ....do | Cr | Violet. |
| 24 | 4-chloro-2-amino-phenol-6-sulfonic acid | ....do | Cu | Red violet. |
| 25 | 4-acetylamino-2-aminophenol-6-sulfonic acid | ....do | Cu | Violet. |
| 26 | 4-nitro-2-aminophenol-6-sulfonic acid | ....do | Cu | Claret. |
| 27 | 4-nitro-2-aminophenol-4-sulfonic acid | ....do | Cu | Red violet. |
| 28 | 2-aminobenzoic acid | ....do | Cu | Red brown. |
| 29 | 2-aminophenol-4-sulfonic acid | 2-N-methyl-N-ethionylamino-5-hydroxynaphthalene-7-sulfonic acid | Cu | Ruby. |
| 30 | 4-chloro-2-aminophenol-6-sulfonic acid | ....do | Cu | Red violet. |
| 31 | 2-aminophenol-4-sulfonic acid | 1-(4'-N-methyl-N-ethionylamino-phenyl)-3-methyl-5-pyrazolone | Cu | Yellow brown. |
| 32 | 1-amino-4-N-cyclohexyl-N-ethionylaminobenzene | 1-acetylamino-8-hydroxynaphthalene-3,6-disulfonic acid | Cu | Violet. |
| 33 | 1-hydroxy-2-amino-4-N-methyl-N-ethionyl-aminobenzene | 1-(4'-β-hydroxyethyl-sulfone-sulfuric acid-ester-phenyl)-3-methyl-5-pyrazolone | Ni | Yellowish brown. |
| 34 | 4-chloro-2-amino-1-hydroxybenzene-6-sulfonic acid | Secondary condensation product of cyanuric chloride, 1-amino-8-hydroxynaphthalene-3,6-disulfonic acid and 4-amino-1-N-methyl-N-ethionylaminobenzene | Cu | Violet. |
| 35 | 6-nitro-2-amino-1-hydroxybenzene-4-sulfonic acid | ....do | Cu | Red violet. |
| 36 | 2-aminobenzene-1-carboxylic acid-5-sulfonic acid | ....do | Cu | Reddish blue. |
| 37 | 1-hydroxy-2-amino-4-N-ethionylaminobenzene | 1-acetoacetylamino-4-N-methyl-N-ethionylamino-benzene | Co | Yellow brown. |
| 38 | 4-acetylamino-2-aminophenol-6-sulfonic acid | 2-N-butyl-N-ethionylamino-8-hydroxynaphthalene-6-sulfonic acid | Cu | Violet. |

We claim:
1. A complex metal compound of an azo-dyestuff, said compound containing a metal of the group consisting of copper, cobalt, nickel, and chromium, said azo-dyestuff having the formula

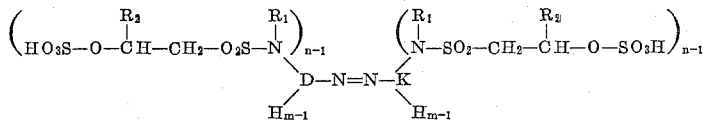

wherein $R_1$ is a member of the group consisting of hydrogen, cyclohexyl, and alkyl having 1 to 5 carbon atoms; $R_2$ is a member of the group consisting of hydrogen and alkyl having 1 to 5 carbon atoms; $n$ and $m$ are each an integer from 1 to 2 inclusive, the sum of $n+m$ being 3, and at least one group

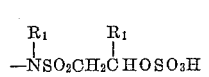

being present in the dyestuff molecule; D is a member selected from the group consisting of benzene, o-hydroxybenzene, o-methoxybenzene, o-carboxybenzene, o-methoxybenzene sulfonic acid, o-hydroxybenzene mono- and di-sulfonic acids, o-carboxybenzene sulfonic acid, o-methoxy-methoxy benzene, o-hydroxy chlorobenzene sulfonic acid, o-hydroxy acetylamino benzene sulfonic acid, o-hydroxy nitrobenzene sulfonic acid, and o-hydroxy naphthalene sulfonic acid; and K is the radical of a coupling component selected from the group consisting of (a) 1-phenyl-5-pyrazolone substituted in the 3-position by a member of the group consisting of —CH₃ and —COOH,
(b) 1-(2'-chloro-4'-sulfo-6'-methyl-phenyl) - 3-methyl-5-pyrazolone,
(c) 1-(4'-β-hydroxyethyl-sulfone-sulfuric acid ester-phenyl)-3-methyl-5-pyrazolone,
(d) naphthalene mono- and di-sulfonic acids substituted by at least one member of the group consisting of hydroxyl, amino, methylamino, acetylamino, benzoylamino, and carboxyphenylamino,
(e) diamino benzene,
(f) acetoacetylamino benzene,
(g) phenylazo hydroxyaminonaphthalene,
(h) phenylazo dihydroxynaphthalene disulfonic acid,
(i) aminobenzene sulfonic acid substituted by a member of the group consisting of amino and hydroxy,
(j) hydroxy azophenyl benzene,
(k) 1-(3'-phenylamino-2',4',6'-triazinyl-5')-amino - 8-hydroxy-naphthalene-3,6-disulfonic acid substituted in the 1'-position of the triazine ring by a member of the group consisting of —Cl and —OCH₃, the molar ratio between the metal and azo dyestuff being 1:1 for copper, cobalt, nickel, and chromium, and 1:2 for cobalt and chromium; said compound containing at least one water-solubilizing group selected from sulfonic acid and carboxylic acid groups.

2. The complex copper compound of the azo-dyestuff having the formula

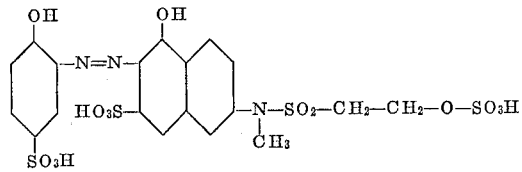

3. The complex copper compound of the azo-dyestuff having the formula

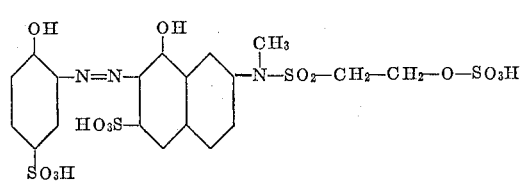

4. The complex copper compound of the azo-dyestuff having the formula

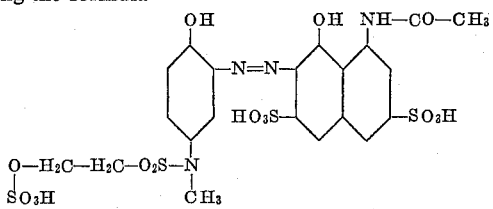

5. The complex cobalt compound of the azo-dyestuff having the formula

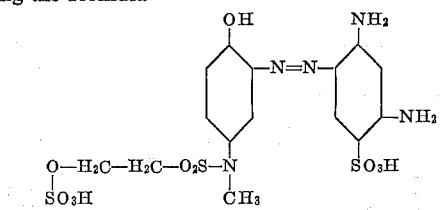

6. The complex cobalt compound of the azo-dyestuff having the formula

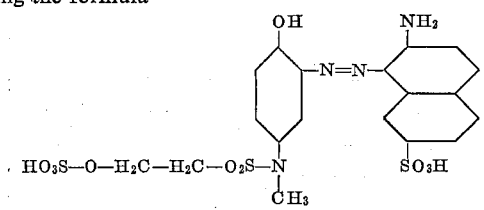

7. The complex copper compound of the azo-dyestuff having the formula

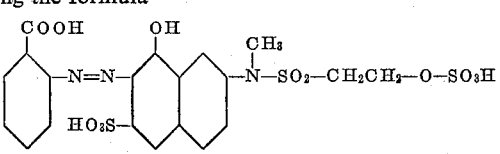

References Cited by the Examiner

UNITED STATES PATENTS

| | | | |
|---|---|---|---|
| 2,991,280 | 7/1961 | Schetty et al. | 260—193 XR |
| 3,007,762 | 11/1961 | Wegmann et al. | 260—151 |
| 3,086,730 | 4/1963 | Davies et al. | 260—145 |
| 3,135,730 | 6/1964 | Heyna et al. | 260—147 |

FOREIGN PATENTS

| | | |
|---|---|---|
| 214,547 | 4/1961 | Austria. |
| 1,082,687 | 6/1950 | Germany. |

OTHER REFERENCES

Wegmann, J., Textil Praxis, October 1958, pp. 1056–1061, 260–144.

Zimmermann, H., Melliand Textilberichte, Vol. 39, September 1958, pp. 1026–7.

CHARLES B. PARKER, *Primary Examiner.*

NORMA S. MILESTONE, REYNOLD J. FINNEGAN, FLOYD D. HIGEL, *Assistant Examiners.*